March 5, 1935.  B. BURNS  1,993,260
OSCILLATING JOINT
Filed Aug. 5, 1929  3 Sheets-Sheet 1
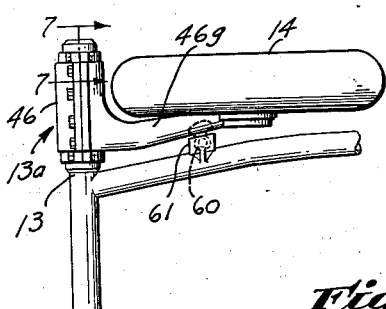
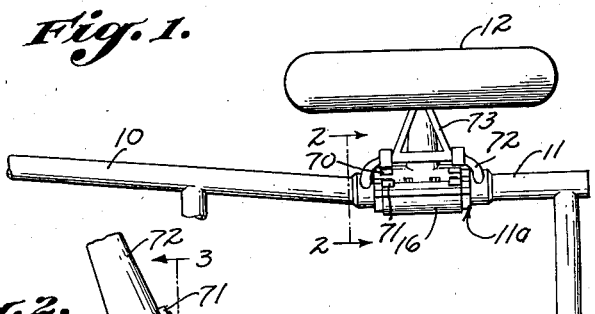
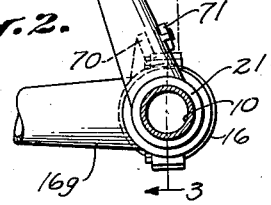
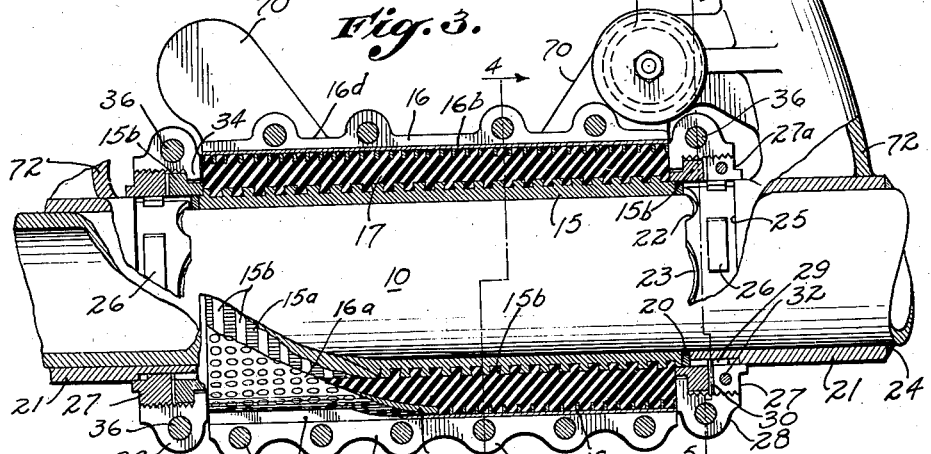
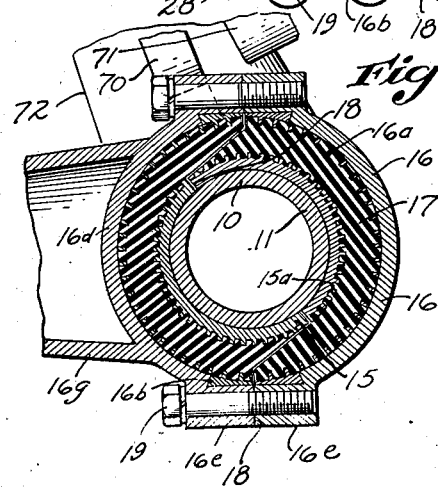
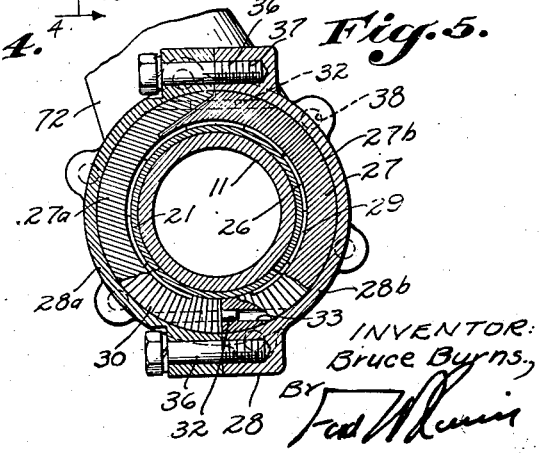
INVENTOR:
Bruce Burns,
BY
ATTORNEY.

March 5, 1935.  B. BURNS  1,993,260
OSCILLATING JOINT
Filed Aug. 5, 1929  3 Sheets-Sheet 2
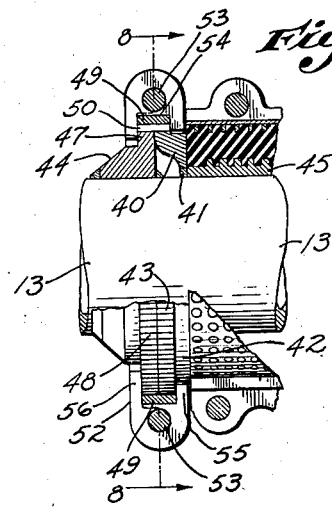
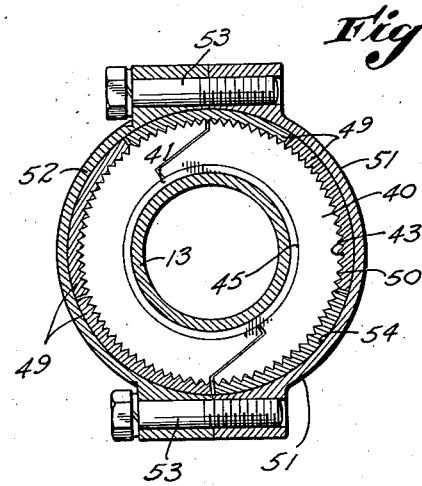
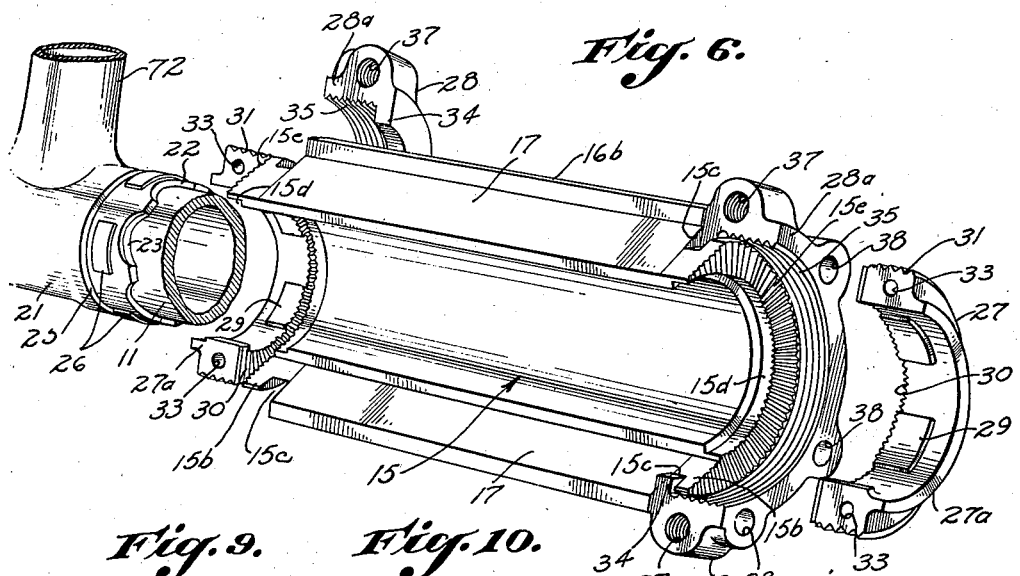
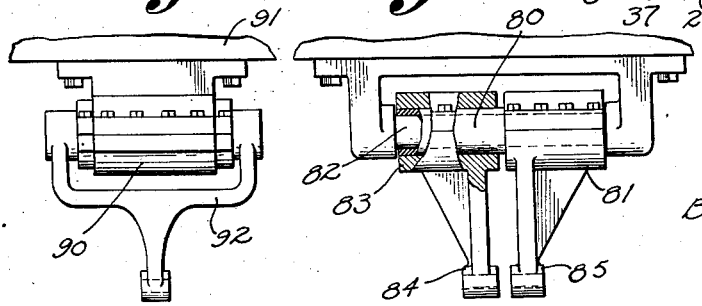
INVENTOR:
Bruce Burns,
BY
ATTORNEY.

March 5, 1935.  B. BURNS  1,993,260
OSCILLATING JOINT
Filed Aug. 5, 1929  3 Sheets-Sheet 3
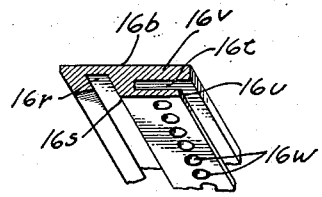
Fig. 11.
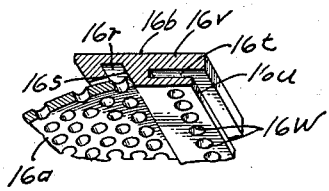
Fig. 12.
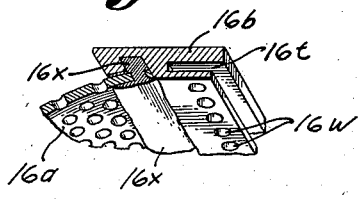
Fig. 13.
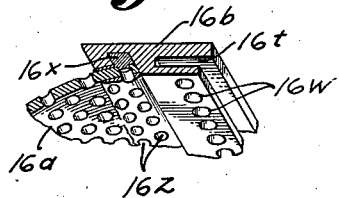
Fig. 14.
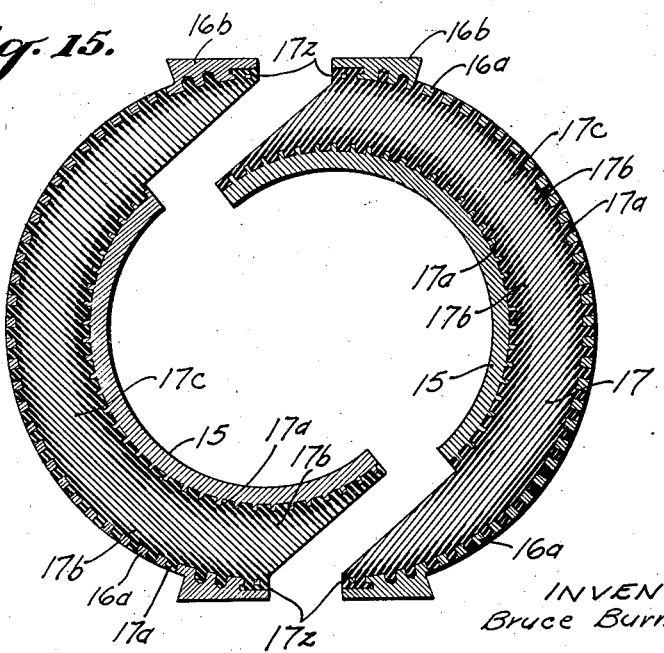
Fig. 15.
INVENTOR:
Bruce Burns,
BY 
ATTORNEY.

Patented Mar. 5, 1935

1,993,260

UNITED STATES PATENT OFFICE 1,993,260

OSCILLATING JOINT

Bruce Burns, Los Angeles, Calif., assignor to Hughes Tool Company, Houston, Tex., a corporation of Texas Application August 5, 1929, Serial No. 383,628

8 Claims. (Cl. 267—21)

This invention relates to oscillating joints and is particularly directed to that type of joint in which rubber or other similar resilient material is employed as the connecting medium between the joint members.

In various types of friction joints it is inconvenient and difficult to keep the parts lubricated and to keep them tight to compensate for wear, with the result that such joints soon become noisy and inefficient when even moderately neglected. This is particularly true with relation to joints employed in automobile construction where such neglect is the rule rather than the exception, and especially in relation to joints associated with the main suspension means of automobiles.

I am aware that heretofore rubber or other similar resilient material has been employed as a medium for permanently joining two joint members so that the oscillation is permitted by reason of a distortion of the connecting resilient material, but, of all of those joints of this general character of which I am at this time aware, the entire joint assembly is of unbroken annular form and can be applied only by being threaded or slid axially over a joint axle, bolt or support.

In many instances there is need of a joint of this general character, which may be transversely applied to surround a joint axle, bolt, or other support, such instances being, for example, where not sufficient room is available to permit the joint to be threaded axially over the support, and where the construction of the supporting structure will not permit any but a transverse application of the joint.

It is therefore an object of the present invention to provide an oscillatory joint structure split into sections adapted to be applied transversely to the supporting axle or member.

A further object is to provide a joint structure longitudinally split into separable sections and having a sectional torsion unit removable from said joint sections for repair or replacement.

Various other objects and advantages will be more fully apparent from the following description of the accompanying drawings which form a part of this disclosure, and which illustrate a preferred form of embodiment of the invention.

Referring to the drawings,—

Fig. 1 is a plan view of a portion of a vehicle frame and a front and rear supporting wheel mounted thereon by means of the improved oscillating joint of the present invention.

Fig. 2 is an enlarged detail section taken on the line 2—2 of Fig. 1.

Fig. 3 is an enlarged detail section taken on the line 3—3 of Fig. 2.

Fig. 4 is a transverse section taken on the line 4—4 of Fig. 3.

Fig. 5 is a transverse section taken on the line 5—5 of Fig. 3.

Fig. 6 is a perspective view showing one of the half-sections of the joint unit and the associated elements which cooperate therewith.

Fig. 7 is a detail section taken on the line 7—7 of Fig. 1, and illustrating a modified form of locking means.

Fig. 8 is a transverse section taken on the line 8—8 of Fig. 7.

Fig. 9 is a view showing another installation of the joint structure.

Fig. 10 is a view showing still another installation of the joint structure.

Fig. 11 is an enlarged detail perspective view of a portion of one of the dove-tail ribs of the lining sleeve.

Fig. 12 is a similar view showing a portion of such lining sleeve associated with said dove-tail rib.

Fig. 13 is a similar view showing said sleeve welded to said rib.

Fig. 14 is a similar view showing the completed structure.

Fig. 15 is a transverse section through the two sections of the torsion unit, illustrating a preferred arrangement of the resilient body.

Although it is fully realized that the joint of the present invention is susceptible of use in many situations, it is desired in this disclosure to illustrate, in detail, a preferred form of structure particularly adaptable for use as a wheel suspension means in automobile construction, and to illustrate in a more general way such modified arrangements as are considered necessary to afford a clear understanding of the full scope of the invention, and to this end the drawings show the joint structure in its employment as suspension means for the front and rear wheels of an automobile, and also illustrate two modified installations to more fully show the adaptability of the joint structure for use in various situations.

In Fig. 1 of the drawings, there is shown a portion of a vehicle frame 10, the side rail of which has a cylindrical portion 11 upon which the joint structure 11a for supporting the front wheel 12 is mounted. A similar joint structure 13a may be employed to support the rear wheel 14 and this rear joint structure may also be mounted on a longitudinal cylindrical portion of the side rail of the frame 10 or it may be mounted upon a transversely disposed cylindrical portion 13 of said frame.

In both installations the construction of the joint is the same excepting in minor details which will be pointed out later; therefore the joint will first be described in connection with its installation as a supporting or suspension means for the front wheel 12, in which installation the cylindrical portion 11 of the vehicle frame 10 constitutes the supporting or axle element of the joint.

Broadly, this joint structure consists of a torsion unit comprising an inner joint member or shell, an outer joint member or shell surrounding and spaced from said inner shell, and an intermediate body of resilient material, such as rubber secured, by vulcanizing or otherwise, to both shells against bodily movement relative thereto, said intermediate body by its distortion permitting relative oscillation of the joint members which are suitably connected to the two structures between which the joint structure forms the oscillating connection. This joint structure or torsion unit is longitudinally split into co-operating sections which can be transversely applied to the joint axle or other supporting structure.

Referring more particularly to the preferred embodiment shown in the drawings, 15 designates an inner joint member or shell which surrounds the joint axle or support which in this instance is the cylindrical portion 11 of the vehicle frame 10, 16 designates an outer joint member or shell which surrounds and is spaced from the inner shell 15, and 17 designates a body of resilient material, preferably rubber, disposed between said shells and secured thereto, preferably by vulcanizing. As particularly well illustrated in Figs. 3 and 4, the outer surface of the inner shell 15 is interrupted or scored to facilitate the securing of the rubber body 17 thereto and in the present instance this is done by cutting into said surface a multiplicity of circularly spaced longitudinal grooves 15a and a multiplicity of longitudinally spaced circumferential dove-tail grooves 15b which intersect said longitudinal grooves. The inner surface of the outer shell 16 is also interrupted or scored to promote adhesion of the rubber thereto; however, for convenience of manufacture and for other purposes to be later pointed out, the outer shell 16 is provided with a lining sleeve 16a which is perforated throughout its area so as to provide the necessary interrupted surface and has formed on its outer surface at diametrically opposite points, longitudinally disposed dove-tail ribs 16b which engage in companion dovetail grooves cut in the inner surface of the outer sleeve or joint housing 16.

This joint structure is longitudinally split as indicated at 18, thus to form two opposed companion sections which may be transversely applied from opposite sides to the central joint axle or support 11, it being noted that the plane of each split 18 is radial until it passes through the outer joint housing 16, the dovetail ribs 16b and lining sleeve 16a, is then abruptly angled to said radial plane while passing through the rubber body 17, and is then again radially disposed in passing through the inner shell 15. This provides joint sections whose co-engaging longitudinal edges overlap each other.

By so splitting the joint structure, the outer shell or housing 16 is divided into two companion sections 16c and 16d each having diametrically opposite series of longitudinally spaced ears 16e. Screws 19 extend through the ears 16e of one of the housing sections and have a screw-threaded engagement in the ears 16e of the opposite housing section and serve to clamp said housing sections and the torsion unit sections together upon the supporting axle 11, this clamping operation being more fully explained later.

The housing section 16d has an arm 16g extended laterally therefrom, which arm may be connected to an element or structure between which element or structure and the support 11 the joint forms the oscillating connection, in the present instance such arm 16g being connected to the king-pin support of the wheel 12.

One of the reasons for providing the outer shell or housing 16 with the separable lining sleeve 16a is that by so doing such lining sleeve may be made by rolling tubes of perforated sheet stock at a great deal less expense than would be occasioned in an attempt to perforate or cross-groove the inner surface of the outer shell 16. Further, if the rubber 17 were directly vulcanized to the outer housing shell 16 and it became necessary to replace a worn torsion unit, the arm 16g would have to be entirely disconnected from the wheel 12 and the large expensive housing unit 16d would have to be discarded and replaced with a similar large unit. Also it would be rather difficult to vulcanize the rubber directly to these large cumbersome housing sections, particularly the section 16d which includes the wheel supporting arm 16g.

With the construction as illustrated, the half-members of the inner shell 15 and of the outer lining sleeve 16a together with the intermediate rubber 17 forms a sectional replaceable torsion unit which is relatively inexpensive and which can be removed or inserted without requiring a disconnecting of the wheel from the arm 16g of the housing. In the manufacture of these torsion unit sections, a half-member of the inner shell 15 and a half-member of the lining sleeve 16a are placed in a mold of proper form together with the required raw rubber, and submitted to a vulcanizing heat sufficient to cause said rubber to enter the grooves of the inner shell member and the perforations of the outer lining sleeve and to insure a proper curing of the rubber and its adhesion to the surfaces of both members to form an integral unit section.

It will thus be evident that while it is preferable to make the outer joint member in the manner described, that is, with an outer housing 16 and a lining sleeve 16a, this is mainly for economy of manufacture and of replacement of worn parts, and that with the parts assembled as shown in Fig. 4, the lining sleeve 15 is locked to the housing 16 by the dove-tail ribs 16b to prevent relative rotation thereof, so that in so far as the broad principle of operation of the joint is concerned these parts are functionally integral and constitute the outer joint member to which the rubber body 17 is secured.

In a joint of this character, either of the joint members may be movable, or both may be movable, that is, the outer shell 16 may be the movable joint member (as in the installations shown in Fig. 1) and the inner shell 15 the stationary joint member, in which case said inner shell 15 will be keyed or fixed to the stationary joint axle by suitable means, such, for instance, as one of the types of locking means shown in the drawings and later to be described, or the outer shell may be the stationary joint member and the inner shell the movable joint member, in which case the outer shell will be connected to a suitable stationary support (as indicated in Fig. 9) and the inner shell will journal on the joint axle and be suitably keyed or otherwise connected to the oscillating element, or both joint members may oscillate on the stationary joint axle (as in the arrangement shown in Fig. 10), in which case the outer shell carries one oscillating arm and the inner shell extends longitudinally and has secured thereto another oscillating arm.

In Figs. 3, 4, and 6 there is shown a particular type of means for locking the inner shell 15 of the joint unit to the vehicle frame or joint axle 11 and since this construction is duplicated at opposite ends of the joint a detailed description of that of one end only will be given.

Projecting longitudinally from the end of the inner shell 15 is an annular extension 15b which is formed to provide an external annular groove 15c and an internal annular recess 15d, and whose entire outer end surface is provided with a series of radial lock teeth 15e. This extension 15b forms an integral part of the inner shell 15 and the splits 18 previously referred to extend through said extension thus dividing it into two sections respectively associated with the two separable joint sections. For convenience of manufacture it is preferable to separately make said extensions and then secure them to the inner shell 15 by welding, as indicated at 20.

At the end of the torsion unit there is a clutch sleeve 21 surrounding the axle 11, the inner end of said sleeve being preferably scolloped as indicated at 22, and said sleeve being secured to the frame 11 by welding 23 located in each scollop recess 22 and by welding 24 at its outer end. The inner end is formed to provide a shoulder 25 and a series of circularly spaced clutch lugs 26. For some installations these clutch lugs may be formed directly upon the joint axle, thus making it unnecessary to employ the welded sleeve 21; however, in the installation of the joint on the tubular vehicle frame, as shown, this welded sleeve construction is desirable.

To apply the split torsion unit to the frame member or joint axle 11 there is required at each end, a clutch ring 27, and a retaining collar 28. The clutch ring 27 has on its inner peripheral surface, circularly spaced clutch lugs 29, which are companion to the clutch lugs 26 on the axle sleeve 21, and its inner radial face is provided with a series of radial lock teeth 30 adapted to intermeshingly engage the like radial lock teeth 15e of the inner shell 15 when the parts are assembled. The outer peripheral surface of this lock ring is screw-threaded, as indicated at 31 in Fig. 6, and said ring is radially split diametrically so as to be divided into two half-sections 27a and 27b, which when in assembled co-engagement are aligned by transverse aligning pins 32 each engaging in pin holes 33 in the opposed flat radial surfaces of said sections, as shown in Fig. 5. In practice it is desirable that these aligning pins 32 have a drive fit in the pin holes 33 of one section and a sliding fit in the pin holes 33 of the opposite section so as to guard against loss of said pins during installation or repair of the joint.

The retaining collar 28 has an internal annular flange 34 and beyond said flange the bore of said collar is provided with internal screw-threads 35, the flange 34 engaging within the groove 15c of the inner shell 15 when the parts are assembled and the screw-threads 35 engaging the externally screw-threaded peripheral surface 31 of the clutch ring 27, as shown in Fig. 3. Similar to the clutch ring 27, the retaining collar 28 is radially split diametrically into two half-sections 28a and 28b and these half sections are clamped in place by clamp screws 36 which engage through apertures in one of said sections and screw into threaded apertures 37 in the opposite section. The outer radial face of the retaining collar 28 has circularly spaced recesses 38 (see Fig. 6) for engagement by a wrench of suitable form with which to screw up said collar.

Thus there is provided a joint axle having clutch lugs, a longitudinally split torsion unit having radial lock teeth and external annular grooves at opposite ends of its inner shell, two sectional clutch rings having radial lock teeth and inner clutch lugs, and two sectional retaining collars.

In installing this joint structure, each of the clutch rings is assembled upon the axle 11 between the opposite series of clutch lugs 26, that is, the two sections 27a and 27b of each ring are applied transversely from opposite sides and the aligning pins 32, preferably carried by one of said sections, are engaged in the pin holes 33 of the companion section. These clutch rings are then slid outwardly until their clutch lugs 29 engage between the clutch lugs 26 on the axle sleeve 21 and abut against the respective shoulders 25 thereof, the clutch rings being thus further separated from each other than when the joint structure is completely assembled, so as to permit the torsion unit to be transversely applied upon the axle.

Having thus applied the clutch rings 27, the two sections of the torsion unit may be transversely applied to the axle between said rings, the inner scolloped ends of the axle sleeves 21 lying within the end recesses 15d of the torsion unit. The clutch rings 27 may then be slid inwardly to engage their radial lock teeth 30 with the companion lock teeth 15e of the inner shell 15 of the torsion unit and the two half-members 28a and 28b of each retaining collar 28 transversely applied, the flange 34 of each collar engaging in the respective groove 15c in the end of the inner shell 15 of the torsion unit and the screw-threads 35 of said collar engaging the external screw-threads 31 of the associated clutch ring 27, as shown in Fig. 3. The sections of the collar 28 are then brought together by the bolts 36 but not at this time tightly clamped thereby.

A suitable wrench may now be engaged in the recesses 38 of the respective retaining collars 28 and these collars rotated to draw the respective clutch rings tightly against the ends of the inner shell 15 of the torsion unit with their lock teeth 30 in close intermeshing engagement with the companion lock teeth 15e of said unit, after which the bolts 36 of the respective retaining collars 28 are tightened to rigidly clamp said collars in place against accidental loosening. Thus the inner shell 15 is locked against rotation relative to the joint axle, through the medium of the cooperating lock teeth on said inner shell and on the clutch rings and through the cooperating clutch lugs on said rings and on the fixed sleeve 21 of the joint axle 11.

With these parts so installed, the sections 16c and 16d of the housing 16 may be transversely applied to the torsion unit from opposite sides and clamped thereto by the clamp bolts 19 with the dove-tail ribs 16b of said unit engaging in the companion dove-tail grooves formed in the inner surface of said housing, as shown in Fig. 4.

The arm 16g of the housing may then be connected, as desired, to the element or device which is to oscillate, in the present instance to the wheel 12 of the vehicle.

This construction may also be employed as a rear wheel suspension means, as indicated in Fig. 1, in which installation the arm 46g of the housing 46 supports the axle of the rear wheel 14. The same form of locking means as previously described, may be here employed, or a modified form of locking means such as is illustrated in Figs. 7 and 8 may be used.

In the structure illustrated in detail in Figs. 7 and 8, there is an extension 40 welded as at 41 on the end of the inner shell 45 of the torsion unit, this extension being split in the same manner as are the extensions 15b in the previously described construction, and formed to provide an external groove 42 and a circular series of longitudinal clutch teeth 43. Welded on the supporting axle 13 is a clutch sleeve 44 providing an annular flange 47 whose periphery is provided with a circular series of longitudinal clutch teeth 48 corresponding to the clutch teeth 43 on the inner shell of the torsion unit. To lock these two series of teeth together I provide a plurality of segmental clutch shoes 49 (see Fig. 8) having cut in their inner surfaces series of longitudinal clutch teeth 50, these segmental sections collectively forming an internally toothed clutch ring having a width equal to the combined width of the two series of clutch teeth 43 and 48 so that when engaged therewith said clutch shoes 49 will interlock with the clutch teeth 43 and 48 and thus prevent rotation of the inner shell of the torsion unit relative to the stationary joint axle 13. To secure the clutch shoes 49 in such locking engagement with both series of narrower clutch teeth 43 and 48, I provide a two-part clamp collar comprising opposed half-members 51 and 52 adapted to be clamped together by bolts 53. The bore of this clamp collar has an internal groove 54 defining opposed internal flanges 55 and 56, said groove 54 being of suitable width to receive the clutch shoes 49.

In installing this structure, the torsion unit is applied from opposite sides of the axle 13, in the position shown, the clutch shoes 49 being then placed to engage both series of clutch teeth 43 and 48, and the clamp collar sections transversely applied over the clamp shoes, as shown in Fig. 7, with the inner flange 55 engaging in the groove 42 and the outer flange 56 engaging the outer surface of the flange 47 of the fixed clutch sleeve 44, the bolts 53 then being applied and tightened to clamp these parts together.

This modified form of locking means may be better adapted for some purposes since it does away with the necessity of radial teeth and a separate clutch ring such as the clutch ring 27 of the previously described construction.

In the employment of a joint of this type, as a wheel suspension means for a motor vehicle, it is desirable to provide a stop means for limiting the upward movement of the wheel supporting arm relative to the frame. To accomplish this in the rear wheel installation shown in Fig. 1, I provide a stop projection 60 on the arm 46g which is aligned with a stop bracket 61 secured to the frame 10, it being understood that the projection 60 is spaced from the bracket 61 to allow a desired maximum oscillation of the joint and to engage said bracket and arrest the movement of the wheel supporting arm if said arm is inclined to oscillate beyond such desired maximum.

Stop means are also provided in the front wheel installation, and in such instance the stop means consists of ears 70 formed on the housing section 16d which are in the path of and spaced from stationary stop members carried by arms 72 integral with and extending upwardly from the respective clutch sleeves 21 of the joint axle or frame 11. In the particular front wheel installation shown these stationary arms 72 also have journalled thereto a radius member 73 which connects with the wheel structure, but this has no direct bearing upon the operation of the oscillating joint and is included in the drawings merely to illustrate a more complete vehicle construction.

In the modification illustrated in Fig. 10 both the inner joint member 80 and the outer joint member 81 are capable of relative oscillation about the stationary joint axle 82, in this instance the inner joint member or shell 80 being extended longitudinally and having clamped thereon a split hub 83 of an oscillating arm 84, and the outer joint member 81 having a similar oscillating arm 85.

In the modification shown in Fig. 9 the outer joint member 90 is fixed to a stationary support 91 and the inner joint member is locked (preferably by locking means of either of the types hereinbefore described) to the joint axle which in this structure is fixed to the oscillating arm 92. Thus in this structure the outer joint member becomes the fixed or stationary element of the joint and the inner joint member and joint axle the oscillating element of the joint.

In the described joint structures there are certain preferred features of construction which have been found to be particularly advantageous and to contribute materially to the successful functioning of the joint in the service for which it is designed.

In Figs. 11 to 15 there is illustrated a preferred method of constructing the lining sleeve 16a and associated dove-tail ribs 16b, and in this preferred construction each companion half member of such rib is formed, as shown in Fig. 11, with a longitudinal groove 16r cut in its inner surface and providing an abutment shoulder 16s, and with a longitudinal retention groove 16t cut in its radial surface, the inner wall 16u being somewhat shorter than the outer wall 16v. Said inner wall 16u is provided with a longitudinal row of apertures 16w, the purpose of which will be hereinafter explained.

As previously stated it is preferable to form the lining sleeve 16a of perforated sheet stock rolled to the desired shape, and as shown in Fig. 12 each half member of the lining sleeve is assembled with the dove-tail rib members with each longitudinal edge thereof engaging the abutment shoulder 16s of one of the rib members so that the first row of perforations align with the groove 16r. Welding 16x is then applied to fill the groove 16r and the first two rows of perforations and securely bond the parts together as an integral unit, as illustrated in Fig. 13. After these parts are thus welded together, the first two rows of perforations are rebored, as shown at 16z in Fig. 14.

Now, when this outer sleeve member is secured by the vulcanized rubber to its companion inner shell member 15 said rubber will enter all of the perforations of the outer sleeve member 16a, the apertures 16w in the rib member 16b, and will form a wall 17z extending past the outer edge of the wall 16u and will also completely fill the groove 16t, as shown in Fig. 15. The rubber, at its outer thin edges, is thus anchored throughout its length in the respective grooves 16t.

In Fig. 15 I have also shown a preferred construction in which the connecting resilient body of rubber is formed of different grades of rubber so that it be more stable closely adjacent the metal joint members and more resilient at the central portion of said body. In practice the central portion 17c of said rubber body will be formed of relatively soft resilient rubber, on each side of such central portion 17c will be a layer 17b of somewhat harder less resilient rubber, and next to these layers 17b will be outer layers 17a of rubber which is somewhat harder and less resilient than the layers 17b. In the vulcanizing process, previously described, the outer layers 17a will flow into the perforations of the outer sleeve member and into the retention cross grooves of the inner shell 15 as well as into the retention groove 16t of the dovetail ribs 16b, and be vulcanized thereto, and the several layers and the central portion 17c will be vulcanized together to form an integral unit. This structure will thus include a resilient body having its greatest degree of strength at its points of adhesion with the metal joint members and its greatest degree of resiliency in the intermediate portion of said body.

Another feature which is of considerable importance is the direction of angularity of the splits 18 in relation to the direction of oscillation under load of the joint structure. As shown in Fig. 4, the inner joint member 15 is stationary and the outer joint member 16 moves in a clockwise direction when the arm 16g is moved upwardly, and in this instance the splits 18 are angled from the inner joint member 15 to the outer joint member 16 in the direction of oscillation, that is in a clockwise direction. The reason for this is that when so arranged an oscillation of the joint caused by the upward movement of the arm 16g relative to the joint structure 11a will tend to stretch the overlapping edges of the rubber at the splits instead of compressing the rubber at these points. With these splits so arranged it has been found that the rubber has less tendency to pull away from the metal members, particularly at the thinner edges, and with the provision of the retention grooves 16t wherein the rubber at these edges is securely anchored, it has been found that the joint will withstand a great degree of oscillation before separation or failure of the rubber.

It will be found that the mechanism herein illustrated and described, while fully capable of fulfilling all of the objects primarily stated, may be variously modified without departing from the spirit of the present invention; therefore it is to be understood that the invention is not to be restricted to the specific forms of embodiment herein disclosed, for it is susceptible of embodiment in various other forms, all coming within the claims which follow.

I claim as my invention:

1. In an oscillating joint, the combination of: a joint axle; a torsion unit surrounding said axle and including an inner shell and an outer shell permanently joined by an intermediate body of resilient material capable of distortion permitting relative oscillation of said shells, said unit being longitudinally split throughout its length to divide it into separable sections adapted to be transversely applied from opposite sides to embrace said axle, each of said splits being angled relative to a radius of said unit so as to provide overlapping coengaging longitudinal edges on adjacent sections; means for clamping said unit sections together when thus applied upon said axle; a series of clutch elements on said axle; a series of clutch elements on the inner shell of said torsion unit; and a connecting clutch member intermeshing with both series of clutch elements to lock said inner shell and said axle against relative oscillation.

2. In an oscillating joint, the combination of: a joint axle; a torsion unit surrounding said axle and including an inner shell and an outer shell permanently joined by an intermediate body of resilient material capable of distortion permitting relative oscillation of said shells, said unit being longitudinally split throughout its length to divide it into separable sections adapted to be transversely applied from opposite sides to embrace said axle; means for clamping said unit sections together when thus applied upon said axle; a series of clutch elements on said axle; a series of clutch elements on the inner shell of said torsion unit; a connecting clutch member intermeshing with both series of clutch elements to lock said inner shell and said axle against relative oscillation; and means for clamping said clutch member in clutching position.

3. In an oscillating joint, the combination of: a joint axle; a torsion unit surrounding said axle and including an inner shell and an outer shell permanently joined by an intermediate body of resilient material capable of distortion permitting relative oscillation of said shells, said unit being longitudinally split throughout its length to divide it into separable sections adapted to be transversely applied from opposite sides to embrace said axle; means for clamping said unit sections together when thus applied upon said axle; a series of radial clutch teeth at an end of the inner shell of said torsion unit; a clutch ring slidably splined on the joint axle and having an opposed companion series of radial clutch teeth; and means for clamping said clutch ring against the inner shell to cause coengagement of both series of clutch teeth to prevent relative oscillation of said inner shell and said axle.

4. In an oscillating joint, the combination of: a joint axle; a torsion unit surrounding said axle and including an inner shell and an outer shell permanently joined by an intermediate body of resilient material capable of distortion permitting relative oscillation of said shells, said inner shell being provided with an extended end having a radial end surface and an external groove and said torsion unit being longitudinally split throughout its length to divide said unit into separable sections adapted to be transversely applied to embrace the joint axle; a clutch ring slidably splined on said axle and having a radial end surface opposed to the radial end surface of said extended end of said inner shell and provided with external screw-threads; and a clamp ring provided with an internal flange engaging in said groove of the inner shell extension and internal screw-threads engaging the screw-threads of the clutch ring and functioning to clamp said opposed radial surfaces together, said radial surfaces having means to intermesh so as to prevent relative oscillation of said inner shell and said axle, and said clamp ring being longitudinally split into sections adapted to be transversely applied after the split torsion unit has been engaged upon the joint axle.

5. In an oscillating joint, the combination of: a joint axle; a torsion unit surrounding said axle and including two joint members spaced apart and an intermediate body of resilient material secured to said members against separation therefrom and by its distortion permitting relative oscillation of said joint members, said unit being longitudinally split to divide it into separable sections adapted to be transversely applied from opposite sides to embrace said axle; means for clamping said sections together when thus applied upon said axle; a series of clutch elements on said axle; a series of clutch elements on one of said joint members; and a connecting clutch member intermeshing with both series of clutch elements to lock said one joint member and said axle against relative oscillation.

6. In an oscillating joint, the combination of: a joint axle; a torsion unit surrounding said axle and including an inner joint member and a shell spaced apart, and an intermediate body of resilient material secured to said member and said shell, and an outer joint member non-rotatably attached to said shell, said unit being longitudinally split the plane of division at one side of said unit being on a plane having a different radius from that of the opposite side, to divide it into separable sections adapted to be transversely applied from opposite sides to embrace said axle so that the plane of joinder of said inner joint member is circumferentially staggered relative to the plane of joinder of said shell; and means for clamping said sections together when thus applied upon said axle.

7. In an oscillating joint, the combination of: an axle; a longitudinally split inner joint member having means positively engaging said axle for locking said joint member non-rotatably to said axle, said member having an interrupted inner surface; a longitudinally split sleeve spaced from said inner joint member, said sleeve having perforations extending radially therethrough; a longitudinally divided body of resilient material vulcanized to and extending into the interruptions and perforations of said inner joint member and said sleeve, said body being capable of distortion to permit relative oscillation of said inner joint member and said sleeve; a longitudinally split outer joint member, the plane of the split of said outer joint member and said sleeve being circumferentially staggered relative to the plane of the split of said inner joint member; and means for locking said outer joint member together and locking said sleeve to said outer joint member.

8. In an oscillating joint, the combination of: a joint axle; a torsion unit surrounding said axle and including an inner shell and an outer shell spaced apart and having opposed interrupted or scored surfaces, and having an intermediate body of resilient material in intermeshing contact with both of said surfaces to prevent bodily movement of said intermediate body relative to said inner and outer shells, said unit being longitudinally split throughout its length to divide it into separable sections adapted to be transversely applied from opposite sides to embrace said axle; means for clamping said unit sections together when thus applied upon said axle; clutch means associated with said axle; clutch means associated with said inner shell; a clutch member for connecting said clutch means to lock said inner shell to said axle; and means for clamping said clutch member in clutching position.

BRUCE BURNS.